Jan. 12, 1937.  E. E. COTANCH  2,067,562
AUTOMATIC TRANSMISSION
Original Filed Aug. 26, 1931   3 Sheets-Sheet 1
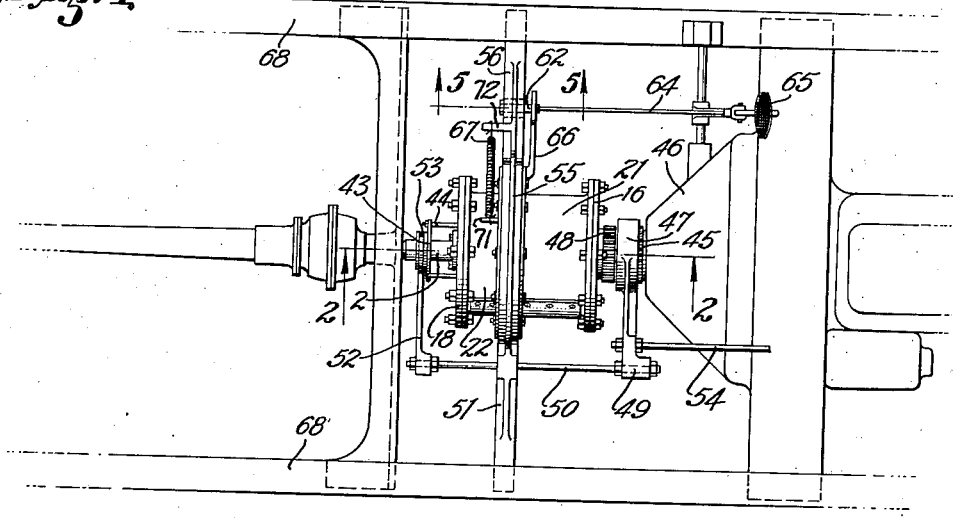
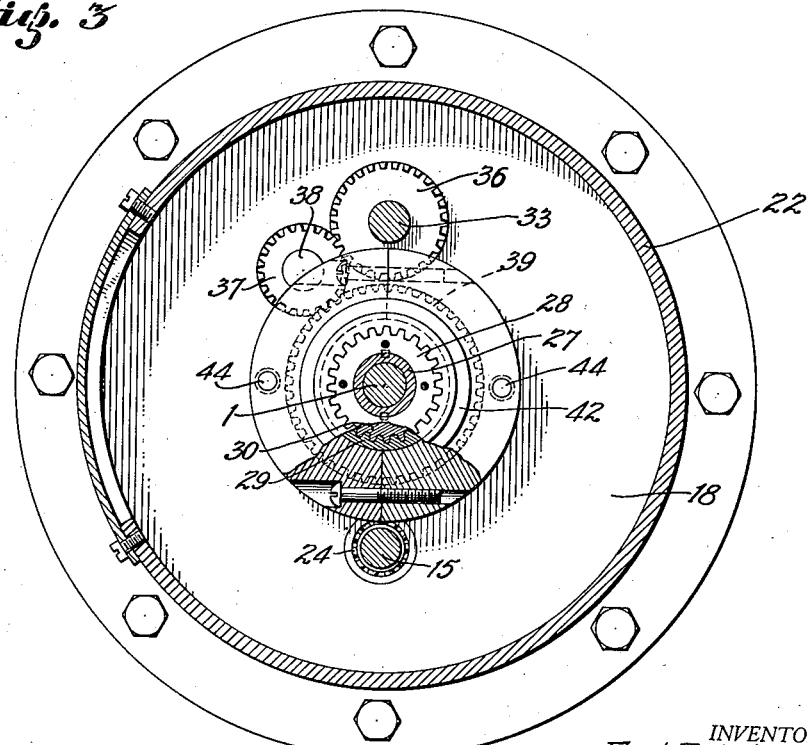
INVENTOR.
*Earl E. Cotanch.*
BY
ATTORNEYS.

Jan. 12, 1937.                E. E. COTANCH                2,067,562
                            AUTOMATIC TRANSMISSION
                    Original Filed Aug. 26, 1931      3 Sheets-Sheet 2

INVENTOR.
Earl E. Cotanch.
BY
ATTORNEYS.

Jan. 12, 1937.      E. E. COTANCH      2,067,562
AUTOMATIC TRANSMISSION
Original Filed Aug. 26, 1931    3 Sheets-Sheet 3
Fig. 4
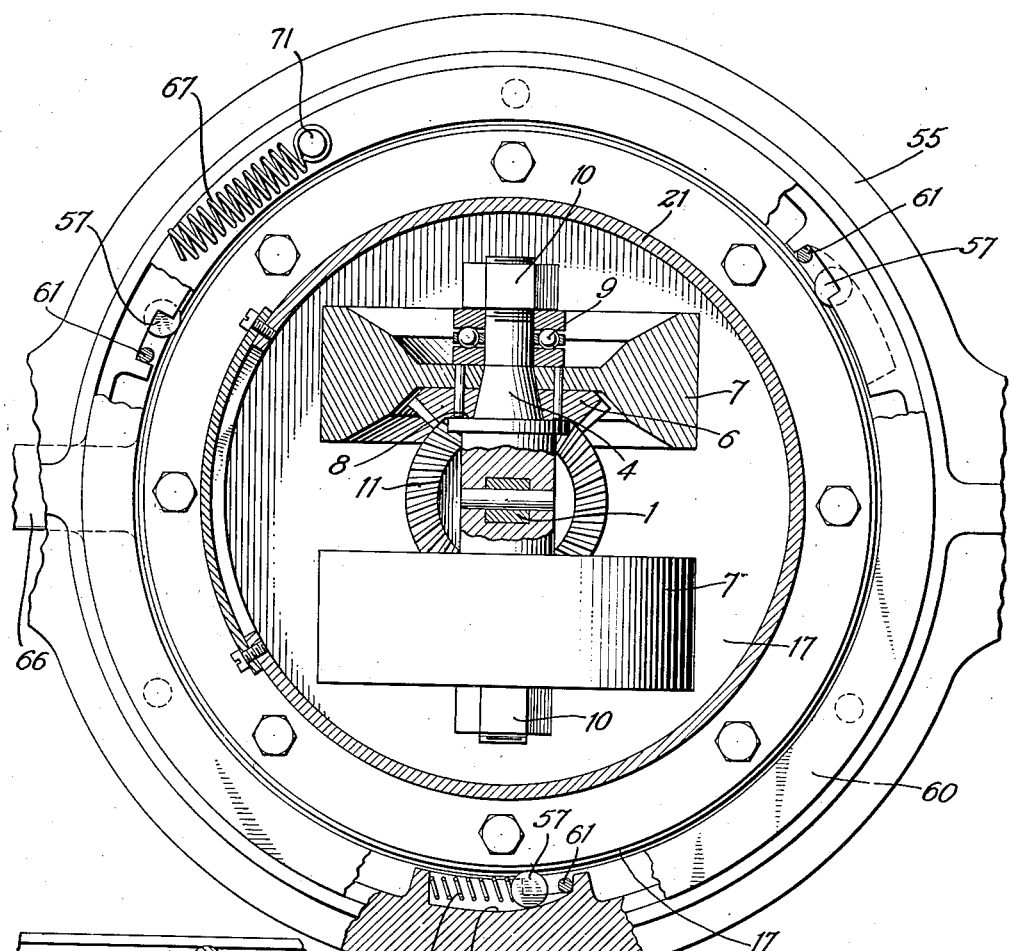
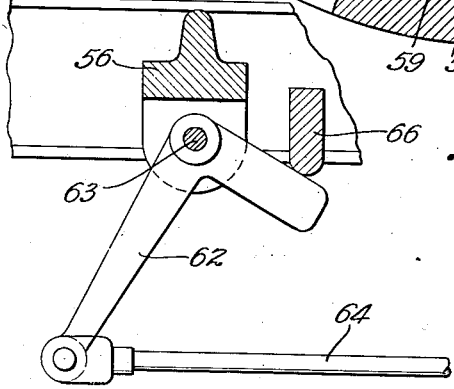
Fig. 5
INVENTOR.
Earl E. Cotanch.
BY
ATTORNEYS.

Patented Jan. 12, 1937

2,067,562

UNITED STATES PATENT OFFICE 2,067,562

AUTOMATIC TRANSMISSION

Earl E. Cotanch, Los Angeles, Calif., assignor to Automatic Rotary Transmission Co., a corporation of California Application August 26, 1931, Serial No. 559,561
Renewed May 10, 1933

49 Claims. (Cl. 74—259)

This invention relates to an automatic transmission, and particularly to one adapted for use in an automobile.

Heretofore, automatic transmissions have embodied differential mechanisms for transmitting power from a drive shaft to either a driven shaft or a drag producing device. The devices used to produce the drag or resistance have been inertia drag members, friction mechanisms, or other devices of a type which are not adapted to transmit the power stored therein to the driven shaft.

An object of the invention is to provide an automatic transmission in which the power is transmitted either through the direct driving mechanism or to another mechanism which transmits the full power transmitted thereto to the driven shaft.

A further object of the invention is to provide an automatic transmission free from oscillating parts so as to have a quiet and smooth action, and in which internal shifting mechanisms, ratchets, and other objectionable locking devices are eliminated.

It is a further object of the invention to provide a transmission in which the forward driving mechanism and the reverse driving mechanism utilize constantly intermeshed gears of the angle or silent type so that the transmission will operate quietly at all times, together with a simple, effective means for placing the transmission in a condition, respectively, of forward, neutral and reverse drive.

A further object is to provide a transmission the drive shaft of which has means for positively driving a driven shaft or other revoluble member, such as a housing, and at double the speed of and in the same direction as the drive shaft, all by means of operatively intermeshed identical gears.

It is a still further object of the invention to provide a transmission wherein means are provided for positively driving a driven shaft or revoluble member through a drive shaft and at a different speed than the drive shaft, by means of gears having a combined gear ratio different than the ratio of speed between the shafts or between the drive shaft and a revoluble member.

A further very important object of the invention is to provide a transmission which incorporates means to obtain a neutral condition between a drive shaft and a driven shaft when the shafts are operatively connected by a gear system of constantly intermeshed gears.

Another object of the invention is to provide a mechanism adapted to be used as a brake as well as for a transmission.

The invention has as another object the elimination of the necessity of disengaging a clutch in the driving mechanism to enable the driven shaft to rotate slower than or faster than the drive shaft.

It is still another object to provide a transmission, having the inertia of the parts thereof, adapted to cause the mechanism to vary the gear ratio with respect to the load on and the speed of the driven shaft, as desired.

Another very important object of the invention is to provide a transmission mechanism in which the housing and other parts of the mechanism rotate with the drive shaft to eliminate friction.

Other objects of the invention are clearly brought out in the following detailed description.

In the accompanying drawings:

Figure 1 is a plan view of the automatic transmission mounted in an automobile.

Figure 3 is a sectional view on line 3—3 of Figure 2.

Figure 4 is a sectional view on line 4—4 of Figure 2.

Figure 5 is a sectional view on line 5—5 of Figure 1.

Figure 2:
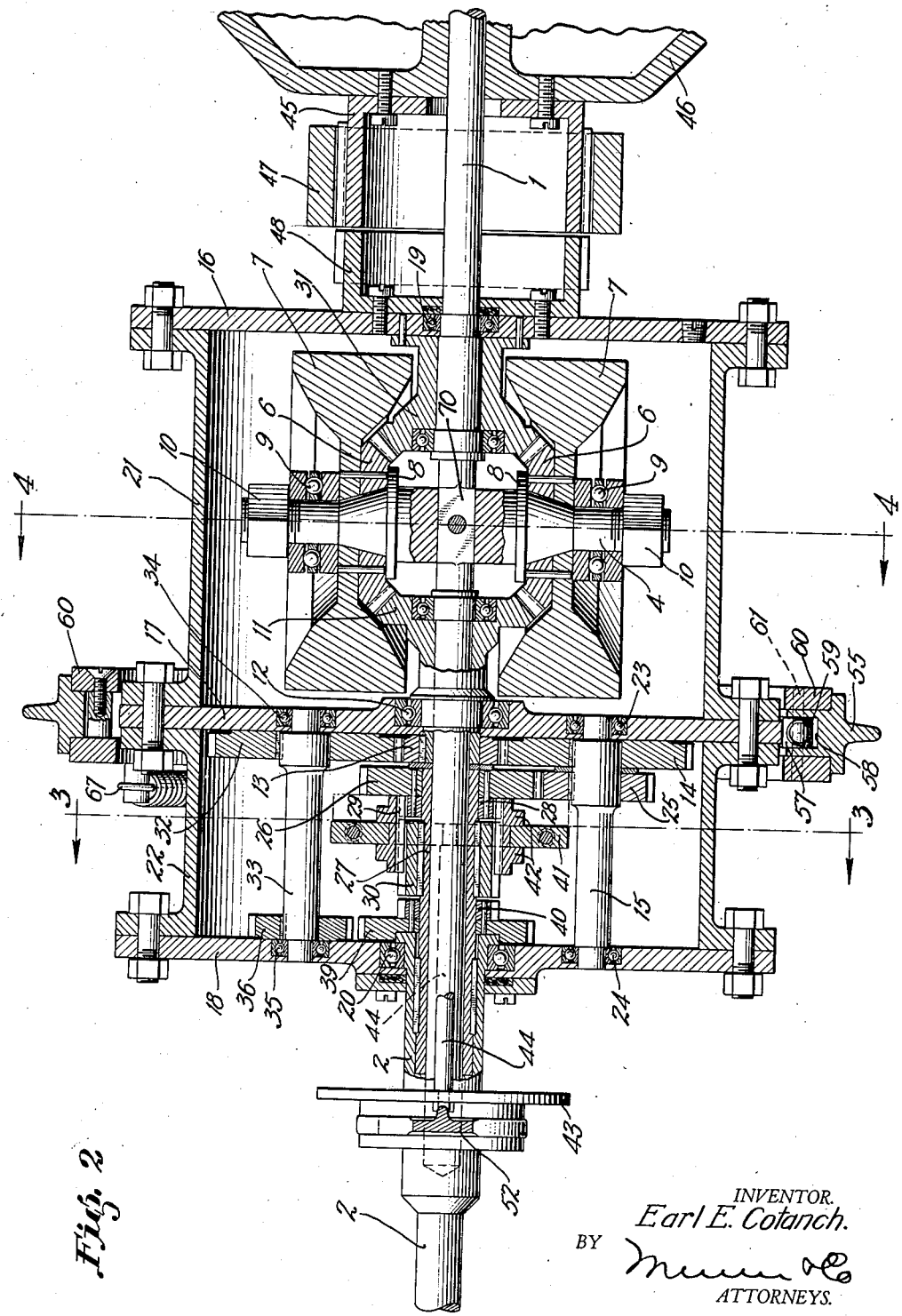
Figure 2 is a sectional view on line 2—2 of Figure 1.

In carrying the invention into practice, a drive shaft 1 is employed and the same is provided with an enlarged squared portion 70 for holding the spindle 4 rigid thereon. Two spiral helical type gears 6 are pinned to identical inertia members 7 and are free to rotate therewith on said spindle, and same are interposed between bearings 8 and 9 on said spindle, and confined upon the spindle by retaining nuts 10.

A spiral helical gear 11 is meshed with the gears 6 and same is free to rotate on the aforementioned drive shaft and to rotate in a bearing 12 and rigidly connected with the gear 11 is a helical gear 13. The gear 13 intermeshes with a larger helical gear 14, which latter is keyed to a countershaft 15. Plates 16, 17, and 18 mounted on bearings 19, 12, and 20, respectively, are bolted to cylindrical members 21 and 22 and the same form a rotatory housing for the respective mechanisms which comprise the invention. Bearings 23 and 24 are countersunk in plates 17 and 18 and journaled therein is a shaft 15 which is parallel to the drive shaft 1. Carried by the shaft 15 and keyed thereto is a small helical gear 25 which meshes with a larger helical gear 26, the latter being free to rotate on a sleeve 27 and same is pinned to a male or external gear 28. A female or internal clutch 29 has interfitting connection with the aforementioned gear 28 and also intermeshes with the spline 30, which latter is keyed to the sleeve 27. At this point, it should be noted that the sleeve 27 is carried by and is keyed to the driven shaft 2. When the sliding gear 29 is in the position shown in Figure 2, an operative power transmission mechanism is provided from the gear 11 through the mechanism just described to the driven shaft 2 in a low gear ratio.

A spiral helical gear 31 intermeshes with the aforementioned gears 6 and is free to rotate on the shaft 1, and, as illustrated, is fixed to the plate 16 in order that it will rotate with the housing of the structure. When the housing rotates and the heretofore described mechanism is stationary with respect thereto and assuming that the sliding gear 29 is in the position shown in Figure 2, it manifestly follows that the driven shaft 2 is compelled to rotate therewith in a direct drive.

A helical gear 32 intermeshes with smaller gear 13 and is keyed to countershaft 33, which shaft is supported in plates 17 and 18 by bearings 34 and 35 respectively. A helical gear 36 is also keyed to shaft 33 and helical reverse idler gear 37 shown in Figure 3 intermeshes with gear 36 and is supported on plate 18 by shaft 38. Helical gear 39 intermeshes with helical gear 37 and is free to rotate on sleeve 27. Male gear 40 is pinned to gear 39 and adapted to fit female sliding clutch 29. When clutch 29 is moved toward gear 39 releasing gear 28 and engaging gear 40 and spline 30, a reverse transmission mechanism is provided from the gear 11 to driven shaft 2 in a low gear ratio.

The sliding clutch 29 is shorter than spline 30 so that it may be placed in a position on spline 30 so as to be out of engagement with gears 28 and 40. When in this position the driven shaft is disengaged from and free to rotate with respect to the described transmission mechanisms.

An internal plate 41 is confined between shoulders 42 on clutch 29 and clutch 29 is free to rotate therein. An external plate 43 is free to slide on shaft 2 and shaft 2 is free to rotate therein. The plates 41 and 43 are held in relative spaced relation by rods 44 which fit slidably in holes in plate 18.

A male gear 45 is pinned to stationary part 46. A sliding female clutch 47 is fitted over male gear 45. Another male gear 48 is pinned to plate 16 and adapted to fit the sliding female clutch 47. An arm 49 is rigidly attached to female clutch 47. The rod 50 is rigidly attached to arm 49 and slides through a hole in arm 51. Arm 52 is rigidly attached to rod 50 and has a portion thereof confined in groove 53 of plate 43. Rod 54 is rigidly attached to arm 49 and provides means for moving the gear locking mechanism.

A ring 55 is held stationary by arms 51 and 56. Rollers 57 are positioned in races 58 of ring 55 and are forced into contact with plate 17 by springs 59. As shown in Figure 4, races 58 are adapted to cause rollers 57 to lock plate 17 from rotating counter-clockwise.

A ring 60 is provided with bars 61 to engage rollers 57 when ring 60 is shifted clockwise to prevent rollers 57 from locking plate 17. Lever 62 is held under arm 56 on pin 63. Rod 64 is pinned to lever 62 and extends to the brake 65. When the brake is applied the lever 62 acts to raise the arm 66 of ring 60 to shift the latter in a clockwise direction. Spring 67 is held at one end by pin 71 on ring 60 and at the opposite end bar projection 72 of arm 56. When the brake is released, spring 67 shifts ring 60 into the original position.

When the drive shaft is rotated and there is no load on the driven shaft, the inertia of members 7 is sufficient to cause the whole transmission to rotate rather than overcome the resistance to rotation of members 7 about their axes. In this case, as previously described, the driven shaft will rotate at the same rate as the drive shaft. The inertia of all parts of the rotating transmission tend to cause the transmission to remain in this condition of direct drive. The transmission is enabled to drive against a relatively heavy load before overcoming the total inertia necessary to cause initial relative rotation of the parts which is necessary to cause a lowering of the gear ratio. The momentum of all the parts revolving about the shaft acts to overcome in direct drive any sudden loads imposed on the driven shaft.

As loads greater than the maximum high gear loads are applied to the driven shaft, the gears 6 are able to move the gear 11 easier than the gear 31 because gear 11 is part of the low gear drive and gear 31 is part of the high gear drive. This causes the gears 6 and the inertia members 7 to rotate so as to cause a portion of the power to be transmitted through the low gear mechanism. The initial force necessary to overcome the resistance to rotation of the members 7 about their axis tends to resist this transfer of power to the low gear mechanism and tends to hold the mechanism in high gear. The speed of rotation of the driven shaft is reduced by the application of the heavier load. The force produced by the change in momentum of all the parts of the transmission rotating with the driven shaft acts in a direct drive to tend to overcome the heavier load. The gear 31 rotates at the slower speed of the driven shaft, and therefore at a much less speed than the gear 11. The force applied to the gear 31 is transmitted to the driven shaft in a high gear ratio, and the force applied to the gear 11 is transmitted to the driven shaft in a low gear ratio. As the speed of the driven shaft is slowed down by a heavy load, the force transmitted through the low gear mechanism becomes greater and the force transmitted through the high gear mechanism becomes less. However, at all times the full energy on the drive shaft is transmitted through the two mechanisms and is only divided to automatically regulate the force applied to the driven shaft in proportion to the load placed thereon.

When very heavy loads are applied to the driven shaft, the gears 6, in tending to give under the heavy load react against the gear 31 in a manner tending to reverse the same. The load on the driven shaft acts through the described direct drive mechanism terminating at gear 31 which acts against gears 6. The load also acts through the described low gear mechanism in the direction from the driven shaft to gear 11 and therefore in a high gear ratio. The resultant of a heavy load applied to the driven shaft is therefore applied on gears 6 with a much less force by gear 11 than by gear 31. This action causes the gear 31 and the housing to tend to rotate oppositely to the drive shaft.

If allowed to rotate backwards, the transmission would idle and avoid moving heavy loads. The locking mechanism provided by the ring 55 and the rollers automatically locks the mechanism against backward rotation. When thus locked, the transmission acts against the load with the power of a solid shaft in low gear.

The ring 60 and apparatus for shifting the same provides means to enable the mechanism to idle against a heavy load by allowing the housing to rotate backwards.

To further illustrate the use of the invention, I will now describe the operation of the same in an automobile. The transmission is mounted on the frame 68 of an automobile as shown in Figure 1. I will first describe the operation of an automobile without the use of a clutch and with the female gear 29 in the position shown in Figure 2.

When the car is standing still the engine may be started provided that the brake 65 is applied. This is possible because the housing is free to rotate backwards.

To accelerate the car forward, the brake 65 is released, enabling the spring 67 to shift the ring 60. Then the rollers 57 lock the housing. This causes the transmission to operate in low gear to accelerate the automobile.

As the automobile is accelerated, the inertia members 7 are rotating about their own axis and rotating with the drive shaft. As the automobile gains momentum, the heavy force on gear 31 which has been tending to reverse the housing, is soon sufficiently lightened to be less than that exerted by gears 6 thereon. The housing will then start to rotate and the power of the drive shaft will be transmitted partially through the high gear mechanism. The kinetic energy of rotation of members 7 about the drive shaft is at all times available to drive gears 11 and 31.

As the automobile approaches a high gear speed, a point of equilibrium is reached in the transmission and the gears 6 cease to rotate. Then the entire transmission rotates as a unit to provide a direct drive in high gear.

When the automobile is traveling at a high gear speed and the supply of fuel to the engine is reduced, the momentum of the automobile will cause a force to be exerted on the driven shaft tending to rotate it faster than the drive shaft. In this case the inertia and friction of all the parts of the transmission tends to cause the shaft 2 to drive the shaft 1 in direct drive. This causes the compression of the engine to be used as an initial braking force in direct drive through the transmission. When the force on the drive shaft, which tends to rotate it faster than the driven shaft, is sufficient to overcome the initial inertia and friction of the transmission, relative rotation of the parts of the transmission will occur producing an effect similar to that of free wheeling. However, the resistance to relative rotation of the parts of the transmission is always sufficient to utilize some of the compression of the engine.

I will now describe the operation when the female clutches 29 and 47 are used in positions other than that shown in Figure 2. When it is desired to use the compression of the engine as a braking force in low gear, the rod 54 is moved to cause the female clutch 47 to engage male gear 48 but not far enough to cause the female clutch 29 to disengage the gear 28. Then the braking force of the compression of the engine is transmitted to the drive shaft in a low gear ratio because the direct drive mechanism is held stationary.

The automobile is placed in neutral by moving the rod 54 so that the female clutch 29 rests entirely on the spline 30.

To reverse the automobile, the rod 54 is moved so that the female clutch 29 engages the gear 40.

I have selected and arranged the parts of the mechanism so as to provide a very desirable functioning of the same in automatically transmitting power in an automobile. Mechanisms may be designed to make use of some of the features of the invention without regard to inertia considerations. However, the desired regulation of the gear ratio with respect to velocity and loads could, in my opinion, best be obtained by the use of parts having the proper inertia.

Referring to the drawings (Figure 2), it will be noted that the gear 11 to which is fastened the gear 13, is operatively connected to the driven shaft 2 by means of the gears 14, 25 and 26 of the low gear driving mechanism and by gears 32, 36, 37 and 39 of the reverse gear driving mechanism.

It is to be understood that features of the invention are to apply to power transmission devices wherever they may be used, and particularly in motor vehicles, lathes, oil drilling and mining machinery, drills, power boats, turbines, presses, brakes, pumps, mixing machines, washing machines, aeroplanes and wherever a drive shaft and driven shaft is used.

While I have described a preferred form of the invention, it is to be understood that the drawings and the description thereof are to be considered as illustrative of, rather than limitative upon, the broader claims because it will be apparent to those skilled in the art that changes in the mechanism may be made without departing from the scope of the invention.

I claim:

1. In an automatic transmission, a drive shaft, a driven shaft, a plurality of driving mechanisms of different gear ratios operatively connected to said driven shaft, and a differential mechanism operatively connected to the drive shaft and to the driving mechanisms, one of said driving mechanisms including the housing of the transmission, said housing being adapted to rotate, and means for preventing the driving mechanism having the highest gear ratio from being driven backwards by heavy loads on the driven shaft.

2. In an automatic transmission, a drive shaft, a driven shaft, a plurality of driving mechanisms of different gear ratios operatively connected to said driven shaft, a differential mechanism operatively connected to the drive shaft and to the driving mechanisms, and an automatic locking device to prevent the one of said driving mechanisms having the highest gear ratio from being driven backwards by heavy loads on the driven shaft.

3. In an automatic transmission, a drive shaft, a driven shaft, a differential mechanism operatively connected to said drive shaft, a low gear driving mechanism operatively connected to the differential mechanism and to the driven shaft, a high gear driving mechanism operatively connected to the differential mechanism and to said driven shaft and including a housing adapted to rotate forward, and an external automatic locking device to prevent the housing from being rotated backwards by the effect of heavy loads on the driven shaft.

4. In an automatic transmission, a drive shaft, a driven shaft, a spindle solid on the drive shaft, inertia members adapted to rotate on the spindle, a plurality of driving mechanisms of different gear ratios operatively connected to the inertia members and to said driven shaft.

5. In an automatic transmission, a drive shaft, a driven shaft, a spindle solid on the drive shaft, inertia members adapted to rotate on the spindle, a low gear driving mechanism operatively connected to the driven shaft, a high gear mechanism operatively connected to said driven shaft and including the housing of the transmission as a rotary part thereof, a differential gearing operatively connecting the high and low gear mechanisms to the inertia members, whereby to effect an automatic selection between the relative use of the high and low gear mechanisms.

6. In an automatic transmission, a rotating housing; a low gear driving mechanism; a reverse gear mechanism; a sliding internal gear locking mechanism provided with a gear adapted to be moved to mesh with a gear of the low gear mechanism to lock the transmission in low gear, adapted to be moved to a position of neutral, and adapted to be moved to mesh with a gear of the reverse gear mechanism to lock the transmission in reverse; and means for operating said locking mechanism from the exterior of the housing.

7. In an automatic transmission, a shaft, a differential mechanism operatively connected to the shaft, a second shaft, a low gear mechanism providing an operative connection from the differential mechanism to said second shaft in a low gear ratio, a high gear mechanism providing an operative connection from the differential mechanism to said second shaft in a high gear ratio, means for stopping the rotation of the high gear mechanism to enable a resistance placed on the first mentioned shaft to act in low gear to retard a forward motion of the second mentioned shaft.

8. In an automatic transmission, a drive shaft, a driven shaft, a differential mechanism operatively connected to said drive shaft, a low gear driving mechanism operatively connected to the differential mechanism and to the driven shaft, a high gear driving mechanism operatively connected to the differential mechanism and to said driven shaft, an automatic locking device for preventing the high gear mechanism from rotating backwards, and manually operative means for holding the locking device from operating to enable the high gear mechanism to rotate backwards and thereby permit the drive shaft to rotate independently of the driven shaft.

9. In an automatic transmission, a spindle adapted to be held rigid on and perpendicular to a drive shaft, beveled gears adapted to rotate on the spindle, a direct drive mechanism having means for operative connection to a driven shaft and having a gear free to rotate on the drive shaft and meshed with the gears on the spindle, and a low gear mechanism having means for operative connection to said driven shaft and having a gear free to rotate on the drive shaft and meshed with the gears on the spindle.

10. In a transmission organization, a shaft, a second shaft, a variable gear transmission mechanism connecting said shafts and including a means on one of said shafts carrying relatively rotatable selective elements, said elements being movable in an orbital path about the axis of and constantly at the speed of one of said shafts, and a driving mechanism having one portion thereof providing a rigid operative connection between the other of said elements and said shafts in one gear ratio and a second portion thereof providing a rigid operative connection between said elements and said other one of said shafts in a different gear ratio than the first said portion thereof.

11. In a transmission organization, a shaft, a second shaft, a variable gear transmission mechanism connecting said shafts for relative changes of speed therebetween and including an element on one of the shafts carrying an inertia mass consisting of relatively rotatable parts respectively having gear means, said mass being movable in an orbital path about the axis of and constantly at the speed of one of said shafts, and respective gear means co-operable with the aforestated respective gear means of said rotatable parts to compel rotation of said parts upon the element as an axis and simultaneously with the aforestated orbital movement of the mass commensurate with any change of speed between said shafts.

12. In a transmission organization, a shaft, a second shaft, a variable gear transmission mechanism connecting said shafts for relative changes of speed therebetween and including a means on the first mentioned shaft carrying relatively rotatable inertia members, said members being movable in an orbital path about the axis of and at the speed of the first mentioned shaft, and a second means to compel rotation of each of said members upon its axis commensurate with any change of speed between the shafts and simultaneously with the aforestated orbital movement of said members, said second means including a driving mechanism having one portion thereof providing an operative connection between said members and said second shaft in one gear ratio and a second portion thereof providing an operative connection between said members and said second shaft in a different gear ratio than the first said portion thereof.

13. In a transmission organization, drive and driven shafts, respectively, a set of respective high, low and reverse driving mechanisms operatively connected with the driven shaft, a housing containing said mechanisms and rotatable in an orbital path about the axis of one of said shafts, a differential mechanism operatively connected with the drive shaft and with the respective driving mechanisms, means to lock the housing against backward motion and for rendering the low gear driving mechanism active, means to free the housing for backward rotation, and inertia influenced means consisting of relatively revoluble parts for reversing the direction of rotation of the housing when the latter is freed as aforementioned and for rendering the low gear driving mechanism inactive and for causing progressive acceleration of the high gear driving mechanism to produce a direct drive in high gear, the said inertia influenced means including an intermeshing four bevel gear differential gearing, the same contained within the housing and certain of said gears being movable in an orbital path about the axis of said one of said shafts.

14. In an automatic transmission, drive and driven shafts, respectively, a high gear driving mechanism operatively connected with said driven shaft, a low gear driving mechanism operatively connected with said driven shaft, a differential mechanism operatively connected with said drive shaft and with said driving mechanisms, said differential mechanism and said driving mechanisms including, in combination, an intermeshing four bevel gear differential gearing to selectively and progressively act upon the said high and low gear driving mechanisms commensurate with any load upon said driven shaft.

15. A transmission comprising a shaft, a second shaft, a forward driving mechanism of the angle gear type operatively connected with one of the shafts, a reverse driving mechanism of the angle gear type operatively connected with the same shaft, a differential mechanism of the angle gear type operatively connected with the other shaft and with the respective driving mechanisms, and means co-operable with said mechanisms to place the transmission in a condition of reverse drive.

16. A revoluble housing, a bevel gear carried by the housing, a drive shaft entering the housing through said gear, an inertia mass supported from the shaft and including oppositely rotatable parts respectively provided with gears in mesh with the gear of the housing, in combination with high and low gear mechanisms operatively connected by a gear system with the respective gears of the aforestated rotatable parts of said inertia mass.

17. In a transmission organization, a shaft, a second shaft, a variable gear transmission mechanism connecting said shafts for relative changes of speed therebetween and including a means on the first mentioned shaft carrying relatively rotatable gears, said gears being movable in an orbital path about the axis of and at the speed of the first mentioned shaft, and means to compel rotation of each of said gears upon its axis commensurate with any change of speed between said shafts and simultaneously with the aforestated orbital movement of said gears, said second means including a driving mechanism having one portion thereof providing an operative connection between said gears and said second shaft in one gear ratio and a second portion thereof providing an operative connection between said gears and said second shaft in a different gear ratio than the first said portion thereof.

18. In a transmission organization, a drive shaft, a driven shaft, a forward driving mechanism of the angle gear type operatively connected to said shafts, a reverse driving mechanism of the angle gear type operatively connected to said shafts and each of said driving mechanisms including constantly intermeshing gears and each of said gears having constant alinement with its intermeshing gear and means co-operable with said driving mechanisms to place the transmission in a condition respectively of forward and reverse drive.

19. A transmission comprising a shaft, a second shaft, a forward driving mechanism of the angle gear type operatively connected to said shafts, a reverse driving mechanism of the angle gear type operatively connected to said shafts, and clutch means on one of said shafts, the said clutch means being operatively connected to the said driving mechanisms and including a toothed surface for intermeshing engagement with coacting gears of said respective driving mechanisms, and means to move said clutch means to respectively different positions on said shaft to place the transmission in conditions, respectively, of forward, neutral and reverse drive.

20. A transmission comprising a shaft, a revoluble member, a plurality of forward driving mechanisms of the angle gear type operatively connected to said shaft, one of said driving mechanisms including the aforementioned member as a rotary part thereof, a reverse driving mechanism of the angle gear type operatively connected to said shaft, and means co-operable with said driving mechanisms to engage said driving mechanisms with said shaft to place the transmission in conditions, respectively, of forward and reverse drive, and means co-operable with said driving mechanisms to disengage said driving mechanisms from said shaft and thereby place the transmission in a condition of neutral.

21. A transmission comprising a shaft, a second shaft, a differential mechanism operatively connected to one of said shafts, a plurality of driving mechanisms operatively connected to the other of said shafts and to said differential mechanism, said differential mechanism and said driving mechanism including, in combination, an intermeshing four bevel gear differential gearing to selectively and progressively act upon said driving mechanisms.

22. In an automatic transmission, independent shafts, differential mechanism connected to one of said shafts and including a common selective element, a rigid high gear driving mechanism connected with the other one of said shafts, a rigid low gear driving mechanism connected to said other one of said shafts, each of said driving mechanisms including means in rigid operative connection with said common selective element of the differential mechanism, and means for rendering one of said driving mechanisms inactive.

23. In an automatic transmission, independent shafts, differential mechanism connected to one of said shafts, a rigid high gear driving mechanism connected with the other one of said shafts, a low gear driving mechanism connected to said other one of said shafts, each of said driving mechanisms including an independent gear in intermeshing engagement with a common gear of the differential mechanism, and means to prevent retrograde rotation of the high gear driving mechanism, said differential mechanism including means to accelerate the transmission from a low to a high gear drive.

24. In a transmission organization, drive and driven shafts, respectively, a set of respective high, low and reverse driving mechanisms operatively connected with the driven shaft, a housing containing said mechanisms and rotatable in an orbital path about the axis of one of said shafts, a differential mechanism operatively connected with the drive shaft and with the respective driving mechanisms, means to lock the housing against backward motion and for rendering the low gear driving mechanism active, means to free the housing, and means for automatically reversing the direction of rotation of the housing when freed as aforestated and for rendering the low gear driving mechanism inactive and for causing progressive acceleration of the high gear driving mechanism to produce a direct drive in high gear.

25. In a transmission organization, drive and driven shafts, respectively, a set of respective high, low and reverse driving mechanisms operatively connected with the driven shaft, a housing containing said mechanisms and rotatable in an orbital path about the axis of one of said shafts, a differential mechanism operatively connected with the drive shaft and with the respective driving mechanisms, means to lock the housing against backward motion and for rendering the low gear driving mechanism active, means to free the housing for backward rotation, and means for reversing the direction of rotation of the housing when freed as aforementioned and for rendering the low gear driving mechanism inactive and for causing progressive acceleration of the high gear driving mechanism to produce a direct drive in high gear, the said reversing means including co-operable parts of the differential mechanism.

26. In an automatic transmission, a shaft, a second shaft, a differential mechanism including a revoluble spindle operatively connected to one of said shafts, a pair of bevel gears adapted to rotate on the spindle and relatively to each other, a plurality of driving mechanisms operatively connected to the other of said shafts, and each of said driving mechanisms including a gear in intermeshing engagement with the gears on the spindle.

27. In an automatic transmission, a shaft, a second shaft, a differential mechanism operatively connected to one of said shafts, a plurality of driving mechanisms operatively connected to the other of said shafts and to said differential mechanism, said differential mechanism and said driving mechanisms including, in combination, an intermeshing four bevel gear differential gearing, and each of said bevel gears having freedom for rotation upon its axis.

28. In a transmission organization, a shaft, a second shaft, a variable gear transmission mechanism operatively connecting said shafts for relative changes of speed therebetween and including a pair of gears supported with their axes at right angles to one of said shafts, and means to compel rotation of said gears upon their axes commensurate with any change of speed between said shafts, said means including a plurality of driving mechanisms and each of said driving mechanisms including a gear in intermeshing engagement with the said pair of gears.

29. In an automatic transmission, a rotary driving mechanism, a gear fastened thereto, a gear locking mechanism cooperative with the said gear and including a toothed surface for intermeshing engagement with coacting teeth of said gear, and means for moving said locking mechanism to one position to engage said gear so as to hold said driving mechanism stationary and to a second position to free the gear.

30. The combination as set forth in claim 29 in which the driving mechanism includes a housing for the transmission as a rotary part thereof.

31. In a transmission organization, a shaft, a reverse gear driving mechanism of the angle gear type operatively connected to the said shaft, a low gear driving mechanism of the angle gear type operatively connected to the said shaft, a high gear driving mechanism of the angle gear type operatively connected to the same shaft, means co-operable with the said driving mechanisms to place the transmission in a condition, respectively, of forward and reverse drive and means to accelerate the transmission from a low gear to a high gear drive.

32. In a transmission organization, a shaft, a second shaft, a differential mechanism operatively connected to the first said shaft and including a pair of gears supported with their axes at right angles to the first said shaft, a plurality of driving mechanisms operatively connected to the second mentioned shaft and each of said driving mechanisms including a gear in intermeshing engagement with the said pair of gears of the differential mechanism, and means to contribute a leverage action to one of said driving mechanisms to cause a positive drive between said shafts through the differential mechanism and through another of said driving mechanisms.

33. In an automatic transmission, independent shafts, a differential mechanism operatively connected to one of said shafts and including a pair of gears supported with their axes at right angles to the last mentioned shaft, a high gear driving mechanism operatively connected to the other said shaft, a low gear driving mechanism operatively connected to the same shaft, and each of said driving mechanisms including a gear in intermeshing engagement with the said pair of gears of the differential mechanism, said differential mechanism including means co-operable with said pair of gears to accelerate the transmission from a low gear to a high gear drive.

34. In an automatic transmission, a differential mechanism including gear means, a plurality of driving mechanisms including gear means all of said mechanisms being co-operatively connected, and the said gear means of the said differential mechanism, in combination with the gear means of the said driving mechanism, providing a continuously intermeshing gear train, and means to cause the said differential mechanism to selectively and progressively act upon the respective driving mechanisms through said gear train.

35. The combination as claimed in claim 34, together with means to contribute a leverage action to a part of the said gear train to cause a positive drive through the rest of the said gear train.

36. A revoluble housing, a bevel gear co-operative with the housing, a drive shaft entering the housing through said gear, a differential mechanism supported from the shaft and including relatively revoluble gears, said gears having intermeshing engagement with the said co-operative gear of the housing, in combination with a plurality of driving mechanisms and each of said driving mechanisms including a gear in intermeshing engagement with the said relatively revoluble gears of the said differential mechanism.

37. In an automatic transmission, a differential mechanism including a pair of idler gears, a high gear driving mechanism, a low gear driving mechanism of a predetermined low gear ratio, and each of said driving mechanisms including a gear in intermeshing engagement with the said idler gears of the said differential mechanism, and means for preventing motion of the said high gear driving mechanism to cause a positive drive through the said idler gears of the said differential mechanism and the said low gear driving mechanism.

38. In an automatic transmission, a shaft, a second shaft, a differential mechanism operatively connected to one of said shafts, a plurality of driving mechanisms operatively connected to the other one of said shafts and to the said differential mechanism, said differential mechanism and said driving mechanisms including in combination an intermeshing four bevel gear differential gearing, and means, automatically operative, to contribute a leverage action to one of said driving mechanisms to cause a positive drive between said shafts through the said differential mechanism and through another of the said driving mechanisms.

39. In an automatic transmission, a shaft, a second shaft, differential mechanism including gear means operatively connected to one of said shafts, rotary forward driving mechanism including gear means operatively connected to the other of said shafts and to said differential mechanism, and the said gear means of the differential mechanism, in combination, with the said gear means of the said driving mechanism, providing a gear train comprising constantly intermeshed gears.

means to lock the said rotary driving mechanism from backward motion to cause a positive drive between said shafts through said gear train, means to free the said rotary driving mechanism for backward motion, and means for rotating the said rotary driving mechanism backwards when freed as aforementioned to cause a neutral condition between said shafts.

40. In an automatic transmission, a shaft, rotary driving mechanism operatively connected with said shaft, and a locking device co-operable with the driving mechanism and including roller means movable relative to said driving mechanism, and means for exerting a constant yielding force for automatically urging the roller means into locking engagement with the aforementioned driving mechanism whereby to prevent retrograde rotation of said driving mechanism when heavy loads are applied to said shaft.

41. In an automatic transmission, a shaft, a second shaft, a differential mechanism directly connected with the first mentioned shaft and including gear means, two driving mechanisms positioned on opposite sides of the said differential mechanism and directly connected with the second mentioned shaft, and each of said driving mechanisms including gear means in intermeshing engagement with the said gear means of the said differential mechanism, and means to cause the said differential mechanism to selectively and progressively act upon the said driving mechanisms.

42. In a transmission organization, a shaft, a spline on said shaft, forward and reverse gear driving mechanisms, respectively, having operative connection with said shaft, a sliding gear locking mechanism co-operable with the spline and with said respective driving mechanisms, and means for moving said gear locking mechanism to respectively different positions on said shaft so that in one position same will coact with a gear of the forward driving mechanism to place the transmission in a condition of forward drive and when in another position to coact with a gear of the reverse driving mechanism to lock the transmission in a condition of reverse drive, and when in still another position to be wholly disengaged from said respective driving mechanisms to thereby place the transmission in a condition of neutral.

43. In a transmission organization, a shaft, a plurality of forward driving mechanisms of the angle gear type operatively connected with said shaft, a reverse driving mechanism of the angle gear type operatively connected with said shaft, means co-operable with said driving mechanisms to place the transmission in conditions, respectively, of forward and reverse drive, and means cooperative with said driving mechanisms to disengage said driving mechanisms from said shaft to place the transmission in a condition of neutral.

44. A transmission comprising a shaft, a second shaft, a plurality of forward driving mechanisms of the angle gear type operatively connected with one of said shafts, a reverse driving mechanism of the angle gear type operatively connected with the same shaft, a differential mechanism of the angle gear type operatively connected with the other shaft, means co-operable with said driving mechanisms, to place the transmission in conditions, respectively, of forward and reverse drive, and means co-operable with said driving mechanisms to disengage said driving mechanisms from the first mentioned shaft to place the transmission in a condition of neutral.

45. A transmission comprising a shaft, a second shaft, a differential mechanism operatively connected to one of said shafts, a plurality of driving mechanisms operatively connected to the other of said shafts and to said differential mechanism, said differential mechanism and said driving mechanism including, in combination, an intermeshing four bevel gear differential gearing, one of said driving mechanisms being of the rotary type and the other of said driving mechanisms including a countershaft supported by an element of the said rotary driving mechanism to provide one of said driving mechanisms with a ratio which is different from the ratio of said rotary driving mechanism.

46. In a transmission organization, a shaft, a plurality of forward driving mechanisms of respectively different gear ratios and of the angle gear type operatively connected to said shaft, a reverse driving mechanism of the angle gear type operatively connected to said shaft, means co-operable with said driving mechanism to place the transmission in condition of forward drive of respectively different gear ratios and in a condition of reverse drive, and means co-operable with said driving mechanisms to disengage said driving mechanisms from said shaft and thereby place the transmission in a condition of neutral.

47. In a transmission organization, a shaft, a plurality of driving mechanisms operatively connected with said shaft, a plurality of gear locking mechanisms operatively connected with said driving mechanisms and means co-operable with said gear-locking mechanisms to move said gear locking mechanisms so as to respectively simultaneously and alternately engage said driving mechanisms.

48. The combination set forth in claim 47 wherein each of the said gear locking mechanisms includes a toothed surface for intermeshing engagement with coacting teeth of certain gears of the respective driving mechanisms.

49. In a transmission organization, a shaft, a plurality of forward driving mechanisms of the angle gear type and of respectively different gear ratios operatively connected with said shaft, a reverse driving mechanism of the angle gear type operatively connected with said shaft, each of said driving mechanisms comprising gear constantly intermeshed, means co-operable with said driving mechanism to place the transmission in conditions of forward drive of respectively different gear ratios and in a condition of reverse drive, and means co-operable with said driving mechanisms to disengage said driving mechanisms from said shaft and thereby place the transmission in a condition of neutral.

EARL E. COTANCH.